(12) United States Patent
Poulakis

(10) Patent No.: US 10,046,514 B2
(45) Date of Patent: Aug. 14, 2018

(54) CONNECTION METHOD IN ADDITION TO A FUNCTIONAL PART WHICH CAN BE USED THEREFORE, AND FLAME-RETARDANT TOTAL SYSTEM PRODUCED THEREBY

(71) Applicant: GOTTLIEB BINDER GMBH & CO. KG, Holzgerlingen (DE)

(72) Inventor: Konstantinos Poulakis, Hildrizhausen (DE)

(73) Assignee: GOTTLIEB BINDER GMBH & CO. KG, Holzgerlingen (DE)

( * ) Notice: Subject to any disclaimer, the term of this patent is extended or adjusted under 35 U.S.C. 154(b) by 0 days.

(21) Appl. No.: 15/121,839

(22) PCT Filed: Mar. 3, 2015

(86) PCT No.: PCT/EP2015/000480
§ 371 (c)(1),
(2) Date: Aug. 26, 2016

(87) PCT Pub. No.: WO2015/131998
PCT Pub. Date: Sep. 11, 2015

(65) Prior Publication Data
US 2017/0066181 A1  Mar. 9, 2017

(30) Foreign Application Priority Data
Mar. 7, 2014  (DE) .................. 10 2014 003 211

(51) Int. Cl.
*B29C 65/16* (2006.01)
*A44B 18/00* (2006.01)
(Continued)

(52) U.S. Cl.
CPC ...... *B29C 65/1635* (2013.01); *A44B 18/0092* (2013.01); *B29C 65/1609* (2013.01);
(Continued)

(58) Field of Classification Search
CPC . B29C 65/16; B29C 65/1635; B29C 65/1609; B29C 65/1616; B29C 65/1677;
(Continued)

(56) References Cited

U.S. PATENT DOCUMENTS 5,897,545 A * 4/1999 Kline ............... A61F 13/49015
24/304
5,957,908 A 9/1999 Kline et al.
(Continued)

FOREIGN PATENT DOCUMENTS

DE 200 21 786 4/2001
DE 103 22 090 12/2004
(Continued)

OTHER PUBLICATIONS

International Search Report (ISR) dated Jun. 19, 2015 in International (PCT) Application No. PCT/EP2015/000480.
(Continued)

*Primary Examiner* — Daniel McNally
(74) *Attorney, Agent, or Firm* — Wenderoth, Lind & Ponack, L.L.P.

(57) ABSTRACT

A connection method, in addition to a functional part used in it and to a flame-retardant total system, connects a single- or multilayer functional part (10) to a third component (20). The functional part (10) has functional elements (14, 16) projecting on one side. The functional part (10) is formed at least partially from a material at least partially transparent to laser light. A blocking layer (18) is disposed to be at least partially opaque to laser light such that after passage of the laser light through the functional part (10), the laser light inside the blocking layer (18) generates heat by absorption for melting the functional part (10) and/or the third component (20) to connect them to one another.

18 Claims, 3 Drawing Sheets

(51) Int. Cl.
  *B29C 65/48* (2006.01)
  *B29C 65/72* (2006.01)
  *B29C 65/00* (2006.01)
  B29L 31/00 (2006.01)
  B29K 105/16 (2006.01)
  B29K 55/02 (2006.01)
  B29K 69/00 (2006.01)
  B29K 81/00 (2006.01)

(52) U.S. Cl.
  CPC ...... *B29C 65/1616* (2013.01); *B29C 65/1677* (2013.01); *B29C 65/1683* (2013.01); *B29C 65/483* (2013.01); *B29C 65/484* (2013.01); *B29C 65/72* (2013.01); *B29C 66/1122* (2013.01); *B29C 66/3452* (2013.01); *B29C 66/45* (2013.01); *B29C 66/723* (2013.01); *B29C 66/72141* (2013.01); *B29C 65/1664* (2013.01); *B29C 65/485* (2013.01); *B29C 66/472* (2013.01); *B29C 66/5326* (2013.01); *B29C 66/71* (2013.01); *B29K 2055/02* (2013.01); *B29K 2069/00* (2013.01); *B29K 2081/04* (2013.01); *B29K 2105/167* (2013.01); *B29K 2995/0016* (2013.01); *B29L 2031/729* (2013.01); *B29L 2031/775* (2013.01)

(58) Field of Classification Search
  CPC . B29C 65/1683; B29C 65/483; B29C 65/484; B29C 65/72
  See application file for complete search history.

(56) References Cited

U.S. PATENT DOCUMENTS

| | | | | |
|---|---|---|---|---|
| 6,596,122 | B1* | 7/2003 | Savitski | B29C 65/1435 156/158 |
| 2005/0094937 | A1* | 5/2005 | Sato | B29C 66/1122 385/33 |
| 2006/0272769 | A1* | 12/2006 | Baylis | B29C 65/1635 156/272.8 |
| 2011/0240200 | A1* | 10/2011 | Korya | B29C 65/72 156/60 |

FOREIGN PATENT DOCUMENTS

| | | |
|---|---|---|
| DE | 20 2004 011 262 | 1/2005 |
| DE | 10 2004 012 067 | 10/2005 |
| DE | 10 2007 015 441 | 10/2008 |
| DE | 10 2007 020 089 | 10/2008 |
| EP | 0 883 354 | 12/1998 |
| GB | 1 400 080 | 7/1975 |
| WO | 97/36566 | 10/1997 |
| WO | 2005/017060 | 2/2005 |

OTHER PUBLICATIONS

Wikipedia, Die freie Enzyklopadie. Bearbeitungsstand: Dec. 1, 2015. URL: http://de.wikipedia.org/w/index.php [abgerufen am Dec. 1, 2015].

Helmut Potente, Fugen von Kunststoffen. Muchen, Wien: Carl Hanser Verlag, 2004, S.225-228. ISBN 3-446-22755-6.

* cited by examiner

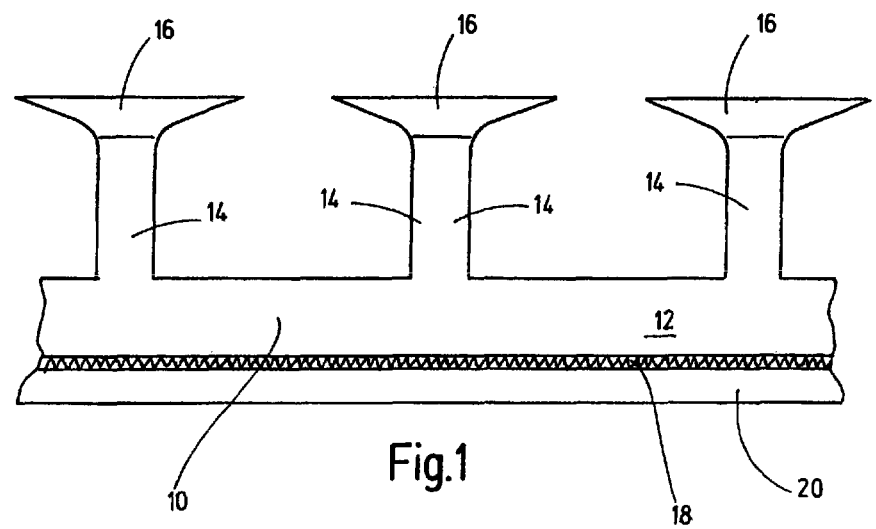
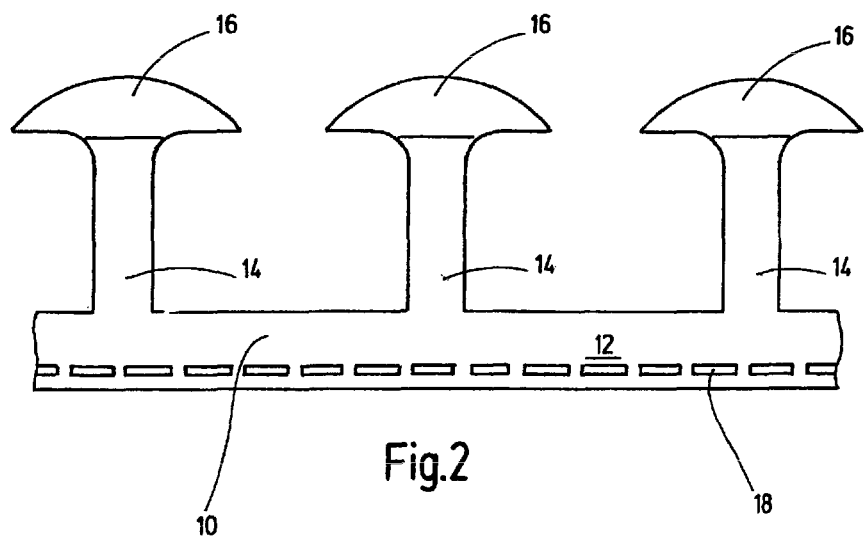

CONNECTION METHOD IN ADDITION TO A FUNCTIONAL PART WHICH CAN BE USED THEREFORE, AND FLAME-RETARDANT TOTAL SYSTEM PRODUCED THEREBY

FIELD OF THE INVENTION

The invention relates to a method for connecting a single or multi-layer functional part to a third component. The functional part has functional elements protruding on at least one side. The invention further relates to a functional part, in particular provided for use in such a bond method and a flame-retardant total system, particularly using the joining method and particularly by using the functional part.

BACKGROUND OF THE INVENTION

EP-B-0 883 354 discloses a flame retardant functional part, in particular a closure part adapted for releasable engagement to a second closure part, comprising:
a tape-shaped substrate element made of a flame retardant polymeric material having an exposed bonding surface and a support surface;
a multiplicity of flexible, resilient stem portions as functional elements, extending generally perpendicular to the bonding surface, the distal stem portions having enlarged head portions located on distal ends of the stem portions, the enlarged head portions having top surfaces opposite the distal stem portions and bonding surfaces opposite the bonding surface of the substrate element, the head portions being disposed to permit movement along different portions of the substrate layer and the releasable engagement with the second fastener; and
a non-flame retardant, pressure sensitive glue applied to the support surface.

The known fastener can satisfy the requirements of the vertical flammability test F.A.R. 25.853(a)(1)(i) without being attached to a substrate. Such provision or specification relates to such fastening systems, in particular relating to applications in vehicle and aircraft technology and are used, for example, for fastening wall panels to the support structure of a cabin of a rail vehicle or attaching upholstery materials and cushion materials to aircraft passenger seats and the like. Today, in particular in the field of aircraft engineering, increased demands are placed on the flammability of such fastening systems, which can be significantly higher than the data in the above specification.

In the known solution described above, in a preferred embodiment, furthermore the non-flame-retardant adhesive is a foam layer of a pressure-sensitive acrylic foam adhesive. Such composed glues are described by way of example in the WO-A-2005/017060 in more detail.

Even though both the pressure-sensitive glue and the aforementioned acrylic foam glue have in practice proved of value in attaching functional parts, such Kletten® or Velcro® fasteners and in particular tape-shaped Gecko® adhesive systems based on Van der Waals forces, to third components, the adhesive bond may yield or fail and, as a result, the functional part is unintentionally detached from the third component, for example in the form of floor or wall parts of an aircraft or vehicle cabin or a part of an aircraft seat or vehicle passenger seat. In particular, in public places or in case of accessible components, such as seats of any kind, in particular in the area of moving aircraft and vehicles, operators, installers and users may be at risk, if in particular larger elements, such as floor and wall coverings, connected by the functional part to the third component, detach unintentionally through failure of the adhesive bond. In addition, production costs for the above-mentioned conventional glues increase rapidly, i.e. there is a need to search for improved bond systems.

SUMMARY OF THE INVENTION

The invention addresses the problem of providing, with respect to the prior art, improved solutions allowing, in a more cost-effective and functionally reliable manner, for an improved bond between these parts in addition to or alternatively to the known adhesive bonding systems.

This object is basically achieved by a method, a functional part, and a flame retardant total system.

The functional part is at least partially formed from an at least partially laser-permeable material. An at least partially laser-impermeable barrier layer is arranged such that after the laser light has penetrated the functional part, the laser light within the barrier layer generates heat by absorption that is suitable for partial melting the functional and/or third component to connect them to each other in this way. The bond between the functional part and third component is achieved in a particularly rational manner by laser radiographic welding. In particular, by forming the laser-impermeable barrier layer between the third component and the allocated side of the functional part to be attached, the energy absorption in the immediate welding area of the two parts to each other is ensured. Also, the material area heated and fused by the laser light, which is to be located both on the functional part and on the third component, forms the joining element for fusing the adjacent joining partners to each other and establishes a secure bond. This bond will reliably hold up even under strain or stress, such as heat input, vibration, impact or shock-like stress etc.

In a particularly preferred embodiment of the connecting process according to the invention, the functional part is provided with a barrier layer on the side facing away from the laser light entrance side and/or the barrier layer is formed by the third component itself or by parts of this component and/or by a separate component.

In the simplest case, the functional part is formed by a preferably transparent, in particular laser-permeable adhesion closure part or adhesion part, and the functional part has a suitable laser light-absorbing barrier layer on the underside facing away from the functional element. Insofar as the aforementioned functional parts are produced by a chill-cast molding process (DE 10 2004 012 067 A1), the mentioned barrier can be intrinsically integrated in the substrate tape side, on which the functional elements, such as mushroom-shaped closure heads, locking hooks, adhesion elements, loop material etc. protrude, during molding, for example by connecting nano-particulate fluids that may also contain appropriate amounts of graphite to the other plastic material of the tape-like substrate element.

A further possibility involves in applying an additional barrier film, for instance in the form of a black-body film, to the backing of the substrate tape facing away from the functional elements. The additional barrier film can also be achieved by a blade coating or coating process, resulting in a firm bond between the black film and the functional part. The coating configuration is particularly useful if a functional part, designed as an adhesion closure part, comprises a base fabric of warp and weft threads, with the fastener elements additionally woven in as functional elements via pile threads in the above manner. Such functional elements may be formed by interlocking elements that are formed at regular intervals from single protruding stem parts, which open at their respective free end in a widened head part and/or formed of closing loops.

In a particularly preferred method, the functional part has a multi-layer design and a substrate element having the closing or adhesion parts as functional elements formed as the one layer of the functional part. The one layer is laterally at least partially overlapped by another layer of the functional part having a specifiable excess that is at least partially formed by a laser-permeable material. After having passed through the excess of the other layer, the laser light strikes the barrier layer or is guided to it. In such a case, the laser bond can only be made by the additional layer of the functional part and the one layer of the functional part having the substrate element. The closing or adhesion parts can also be impermeable to laser light, i.e. pigmented closure and adhesion parts may be used. Provided the substrate element has stem and head parts as functional elements, the light can be guided in the direction of the barrier layer via the respective head and stem parts, i.e. the laser light can be guided through the stem parts in the manner of light in a fiber optic cable.

Particularly preferred, in a process according to the invention that in addition to the laser bond, a second bond system is introduced between the functional part and the third component as an additional safeguard against unintentional disengagement. In this way, the cured adhesive bond may possibly fail due to severe mechanical stress, but the bond between the functional part and the third component is still secured by the laser bond and the joining areas fused to each other. If, however, very high temperatures occur, the laser bond may yield, especially if the area of the joint partners formed of plastic materials should melt away, with the result that the bond will still be secured by the adhesive input. In this way, the redundant, system covers multiple stresses, meets the strictest requirements of aeronautical engineering and complies with the latest requirements specifications in that respect.

Surprising to an average person skilled in the art is that combining two completely different bond systems (lasing and bonding) yields such improved results. No equivalent is in the prior art.

Other objects, advantages and salient features of the present invention will become apparent from the following detailed description, which, taken in conjunction with the drawings, discloses preferred embodiments of the present invention.

BRIEF DESCRIPTION OF THE DRAWINGS

Referring to the drawings that form a part of this disclosure and that are schematic and not to scale:

FIG. 1 is a side view of a section of a micro-replication process adhesion part having a blackbody film underneath produced according to a first exemplary embodiment of the invention;

FIG. 2 is a side view of a section of an adhesion closure part preferably produced in accordance with a chill-cast process having stem and head parts protruding on a substrate tape as interlocking elements with intrinsically embedded nano-particulate black bodies produced according to a second exemplary embodiment of the invention;

DETAILED DESCRIPTION OF THE INVENTION

Figure 3:
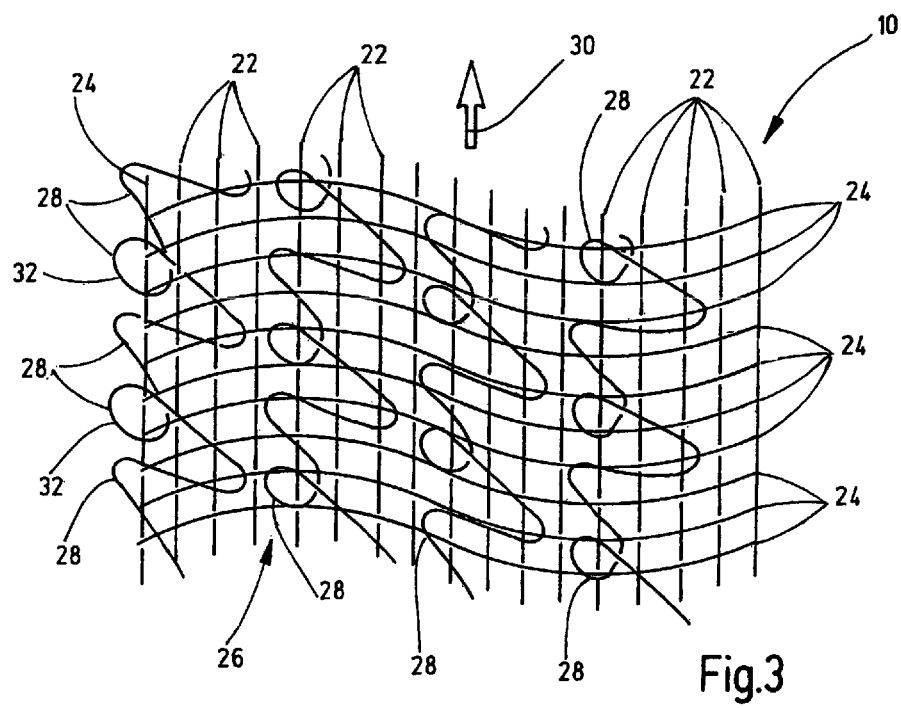
FIG. 3 is a plan view of the fabric image of an adhesion closure part according to a third exemplary embodiment of the invention.

FIG. 1 shows a section of a functional part 10 having a substrate element 12 in the form of a substrate tape of predetermined length, transverse and height dimensions. Vertically protruding stem parts 14 are arranged on the substrate element 12, which stem parts widen towards their upper free ends and form head parts 16. Head parts 16 are integrally connected to the allocatable stem parts 14. The relevant stem parts 14, along with the head parts 16, form from the individual functional elements of the functional part 10.

Such functional part 10 can be produced by a micro-replication process as shown in DE 10 2004 012 067 A1, by way of an example. The functional part shown in FIG. 1 forms an adhesive part. The generated functional element structure is very small, i.e. there may be more than 16,000 functional elements per square centimeter on the tape-shaped substrate 12. In particular, the functional elements in the plane of projection extend not only in the longitudinal direction of the tape, but also in accordance with predetermined patterns (not shown), transverse to the direction of the tape. The adhesion of the free sides of the head parts 16 on structures to be attached, such as glass parts, plastic sheets, but also preferably coated fabrics etc. is based on van der Waals forces, which can reach very high adhesion forces due to the plurality of functional elements. To release the structures to be attached from the adhesion part in the form of the functional part 10 in accordance with FIG. 1, the respective surface preferably is peeled off from the surface of the head parts 16 at an angle of 90° or more to release the adhesion via the van der Waals forces. The attachment and release processes described above can be conducted several times, depending on the configuration of the closing system, preferably thousands of times.

To be able to produce the functional part 10 according to the illustration of FIG. 1 using the micro-replication process mentioned above, special inorganic and organic elastomers are used for the functional part 10. Polyvinyl siloxanes and silicone elastomers cross-linked by adhesion in the form of 2-component systems and acrylates have proven to be particularly advantageous input materials. The plastic materials described above can be designed such that they are, at least partially, transparent, in particular, laser-permeable, with the advantage that laser light can penetrate the functional part 10 shown in FIG. 1 from top to bottom more or less freely.

As can also be derived from FIG. 1, a barrier layer 18 is on the underside of the tape-shaped substrate element 12, which barrier layer is largely laser-impermeable and is formed in particular in the manner of a black body. Thus, the barrier layer 18 can, in accordance with FIG. 1, be a blackbody film. Preferably, the film 18 can be blade-coated to the underside of the carrier belt such that the tape 12 and film 18 enter into a fixed bond with each other. However, the film 18 can be glued to the underside of the tape 12 by a suitable glue. Such two-layer functional part 10 can then be placed on a third component 20, which preferably likewise is formed of plastic materials, although this is not mandatory. In particular, the third component 20 can be formed by a frame element of a vehicle or aircraft passenger seat or part of wall parts of a vehicle or aircraft cabin. If the laser light now passes through the functional part 10, it encounters the barrier layer 18, generating heat by absorption within the barrier layer 18. This heat is suitable for surface-melting the functional part 10 and/or third component 20, to firmly join them to each other.

The wavelength of the laser radiation is adapted to the individual absorption characteristics of the thermoplastic material of the blackbody film 18. The absorption coefficient for the selected wavelength is preferably between 5% and 40%. Preferably, laser radiation having a wavelength in a wavelength range from 400 nm to 2000 nm is preferably used for the embodiments described herein above. Preferably, the laser radiation or the individual laser beams as a whole have a Gaussian beam profile. By a suitable choice of the laser radiation, their division and focus in the system areas of the partial components to be connected described above can be firmly connected or welded in a cost effective and functionally reliable manner.

For special bond applications, the use of a pulsed laser has proven to be advantageous. With proper selection of the laser and the materials used, a connecting melting region having a diameter or width of less than 1 mm, preferably less than 0.5 mm, furthermore preferably less than 0.1 mm can be produced. This dimension is important because, in view of the small size of the components to be interconnected, larger interconnecting areas could be damaging to the material and would result in the attachment system becoming unusable. Suitable lasers for transmission techniques using laser light, are for example, solid-state lasers such as Nd:YAG lasers having a wavelength of 1064 nm and high-performance diode lasers having wavelengths in the range from 800 to 1000 nm. The black-body film 18 can be a polyamide film having embedded sensitive particles, in particular color pigments, such as carbon black or the like. These particles have a corresponding minimum temperature stability. Film thicknesses of 0.03 to 0.1 mm, preferably 0.05 mm, can be used.

The barrier layer 18 can also form an independent component, which shall then be inserted between the functional component 10 and the third component 20. After the components have been held together, which can be done by hand, the bond process using laser light takes place. Obviously, the barrier layer 18 may also be arranged on the third component 20 or third component 20 itself can have on its outer peripheral side of a suitable barrier layer material, for example in the form of sprayed soot, to ensure the absorbency at the third component 20 during lasing, and therefore, the secure bond of the functional part 10 to the third component 20.

Hereinafter, further embodiments shall be explained only to the extent by which they differ significantly from the preceding embodiment.

The embodiment of FIG. 2 is a adhesion closure part, as can be produced for example by a process as indicated by DE 10 2007 015 441 A1. Other shaping processes can also be used, for example using shaping rollers. The pertinent manufacturing process is referred to as "chill-cast" shaping process in technical terminology. In accordance with the exemplary embodiment of FIG. 1, the functional part 10 is in turn formed by a tape-shaped substrate element 12 having protruding stem parts 14 and end-side head parts 16 integrally arranged thereon. In contrast to the solution according to FIG. 1, however, the adhesion closure part according to FIG. 2 has been designed larger by several orders of magnitude and is intended in particular to interact with another adhesion closure part (not shown) to create a repeatedly releasable and closeable adhesion closure. For instance, a loop material of another adhesion closure part (not shown) can hook into the protruding projections under the mushroom-shaped head parts 16 to permit such bond. Further bond solutions are known in which comparably formed head parts of another adhesion closure part (not shown) enter into a releasable closure, i.e. bond with the shown functional part 10 of FIG. 2. Such adhesion closure parts and adhesion closure systems are well known, i.e. at this point they will not be elaborated on. Such adhesion closure parts are particularly suitable to attach upholstery materials, also of a textile nature, onto upholstery parts.

Additives shall constitute the barrier layer 18 of the present exemplary embodiment of FIG. 2, for example in the form of carbon nanotubes (CNTs) and/or carbon fibers, which can be integrated in the base material of the plastic during molding. Such carbon materials also have the advantage of electrical conductivity, i.e. any static loads of the functional part 10 can be discharged via the carbon materials. The aforementioned additives, in particular in the form of carbon nanotubes, are also available in liquid form, i.e. such liquid can be placed on the exposed underside of the substrate tape 12 during molding.

Another option of manufacturing would involve in first filling the mold cavities of the mold with laser-permeable material in a first molding step and then rapidly dyeing the plastic material towards the unattached bottom of the substrate tape 12 to form the absorption layer as a barrier layer 18.

Figure 4:
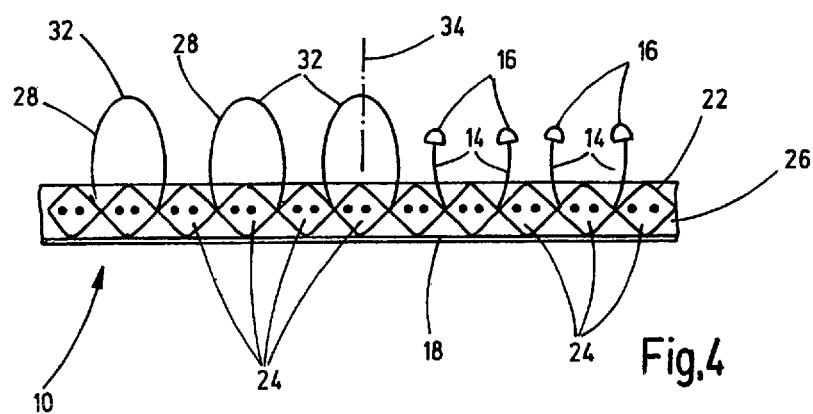
FIG. 4 is a side view of the planar adhesion closure part according to the exemplary embodiment of FIG. 3 having a blackbody film underneath.

The additional third embodiment in accordance with FIGS. 3 and 4 shows in FIG. 3 a partial plan view of a sheet-shaped adhesion closure part, which can be arbitrarily extended within the image plane of the blank part in one and in the other image direction. The geometrical dimensions of planar materials as a functional part 10 depend on the requirements of the weaving device, in which the closure part is manufactured. In particular for the later use of such closure parts, they may be designed in the form of roll-shaped reeled adhesion closure tapes (not shown). The closure part as a functional part 10 has warp threads 22 and weft threads 24 woven together in cross arrangement forming the base fabric 26 for the adhesion closure part. Furthermore, the base fabric 26 is equipped with functional threads 28 as functional elements of the functional part 10, forming a further part of the base fabric 26. The individual functional thread 28 then forms the tape-shaped adhesion closure part of the individual functional or closure elements, as explained in greater detail below. Furthermore, in technical terminology the threads used are often called yarns.

In FIG. 3, the production direction for the closure part to be produced is depicted on its top face by an arrow 30. In the illustrated arrangement of FIG. 3, the weft threads 24 are formed arc-shaped in the manner of a sinusoidal or cosinusoidal wave. At the intersection of warp threads 22 and weft threads 24, the warp threads 22 run in parallel to the production direction 30 and parallel to each other in a rectilinear arrangement. In the illustrated embodiment, only the weft threads 24 are arranged arcuate in the base fabric 26, such that, in an alternating sequence, the respective weft threads 24 run over a warp thread 22 and run under the one warp thread immediately next to it. The advantage of such an arcuate configuration is explained in more detail in DE 10240986 B by the holder of the proprietary rights, such that it shall not be explained in greater detail in this context.

At the point where the respective weft threads run under the warp threads in the base fabric 26, the functional or pile thread 28 forms an overlying loop 32, which is immediately adjacent to another loop 32, resulting in a kind of V-link. There are here, however, other types of links conceivable, such as the inclusion of the functional thread 28 in a W-shaped manner or the like, for example.

Those loops 32 form a type of fastener elements from the functional elements. If the loops 32, as shown in FIG. 2, remain closed, a frieze adhesion closure part is obtained. The hook or mushroom-like closure elements (see FIG. 2) can engage in the relevant loops 32 to obtain a releasable fastener as a whole as part of a closure or attachment system. There is also, according to the illustration of FIG. 4, which depicts a longitudinal view of the longitudinal alignment of arrow 30 on the functional part 10, the option of melting, at least partially, the individual loops 32 along a dividing line 34. In this way, after the free ends of the open loop have surface-melted, both a closure element with stem part 14 and mushroom-shaped head part 16 are formed corresponding to the illustration according to FIG. 2.

As the base fabric shown in FIG. 3 has largely rectangular recesses between the individual thread systems 22, 24 and 28, there is the option of the laser light penetrating such distances for the purpose of hitting a barrier layer 18 arranged on the underside of the functional part 10 as a further layer, which in turn, can be designed for example in the manner of a blackbody film. In this manner woven, knitted and interlaced closure materials can be attached to third body components by a laser.

When using the thread solution according to FIGS. 3 and 4, a separate barrier layer, for instance in the form of a blackbody film 18 to be attached, can be omitted, by just rendering individual threads of the base fabric 26, consisting of warp and weft threads 22, 24, black, for instance by using carbon, resulting in a material having a high absorbency for laser light.

Figure 5:
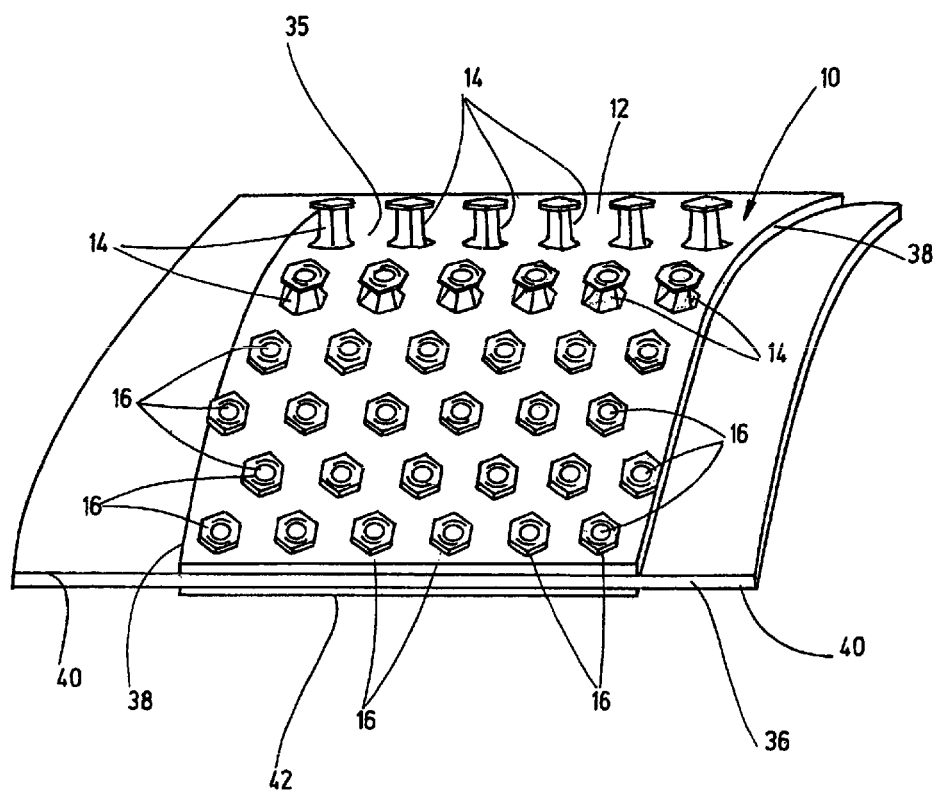
FIG. 5 is a perspective plan view of a multilayer functional part in arched form as part of a flame-resistant total system according to a fourth exemplary embodiment of the invention.

In the embodiment of FIG. 5 an adhesion closure part is again used as functional part 10, having a tape-shaped substrate element 12, from which the individual stem parts 14 and their end-side head portions 16 protrude with a specifiable projection. Such adhesion closure part as a functional part 10 can in turn be obtained by a production process, as indicated in the embodiment according to FIG. 2. However, both the stem part 14 and the head part 16 are shaped like polygons in the present case, in particular in the form of a hexagon. The functional part 10 according to the embodiment of FIG. 5 may be laser permeable, but does not need to be. Preferably, however, the functional part 10 is multi-layered according to the representation of FIG. 5 and has, on its underside, as part of the functional part 10, a further layer 36. Layer 36 laterally protrudes, as viewed in longitudinal direction, along and from both longitudinal edges 38 of the first layer, with a specifiable excess of the first functional part 35 with its protruding functional elements 14, 16. At least in the region of the excess, the additional layer 36 is formed to be laser-permeable. Alternatively, the entire additional layer 36 can also be formed laser permeable.

On the bottom of the first functional layer 35 and second functional layer 36, a third functional layer 42 is formed by a glue, in particular in the form of a polyurethane hot melt glue. Such polyurethane hot melt glue preferably has the following formula:

10-90% polyester-polyol,
0 to 50% polyester-polyol,
5 to 35% polyisocyanate,
2 to 50% flame retardants such as phosphorus and/or triazine compounds free of antimony and halogens, and if required, additives such as catalysts and stabilizers.

In this way, a solvent-free hot melt glue, cross-linked by moisture, is realized on the basis of reactive polyurethane tripolymers. The relevant melting glue as an additional third functional layer 42 is instantly reactive and can be directly connected to a third component 20 in a glue-fixed bond manner by placing it thereon. If the third component 20 is formed as a black body in the area of the projection 40 of the additional second layer 36, the overall composite shown in FIG. 5 can be securely attached via the laser-permeable projection 40 using laser light. Due to this laser bond and the glue bond, a redundant overall system has been created. If one bond system fails, the other bond system ensures a secure bond.

If no redundant system is desired, the glue layer 42 can be omitted and the bond to third component 20 can be established via a correspondingly provided barrier layer 18 for laser light using the laser-permeable projection 40 of the second functional layer 36. As a matter of course, viewed in direction of FIG. 5, the glue layer 42 can be covered downwards by a backing paper (not shown). After the removal of the backing paper, the glue layer is then exposed and adheres to the third component 20.

The solution according to the invention, in which the respective third component 20 is an injection-molded part, and is made, for example, from a polyphenylene sulfide (PPS), can be implemented particularly well. For the additional second layer 36 depicted in FIG. 5, flame-retardant plastics are used, for instance compounds of polycarbonate (PC) with acrylonitrile butadiene styrene (ABS). Overall, a flame retardant total fastening system is created using the aforementioned materials, pointing in particular towards a use in aircraft technology and passenger transport. Instead of the active agent formulation for the glue as a third functional layer 42, alternatively a flame retardant acrylic glue can also be used.

While various embodiments have been chosen to illustrate the invention, it will be understood by those skilled in the art that various changes and modifications can be made therein without departing from the scope of the invention as defined in the claims.

The invention claimed is:

1. A method of connecting a single or multiple layer functional part to a component, the method comprising the steps of:
providing a functional part including a substrate element having closing or adhesion function elements in a form of hook-and-loop fasteners or Van der Waals fasteners protruding on a first side of said substrate element and formed as one layer of the functional part, the functional part being formed at least partially from a material at least partially transparent to laser light;
disposing a barrier layer at least partially opaque to laser light such that after passage of the laser light through the functional part, the laser light inside the barrier layer generates heat by absorption of the laser light;
placing the functional part and barrier layer on a component; and
exposing the functional element to laser light to melt from the heat generated in the barrier layer by the laser light the functional part or the component to connect the function part and the component.

2. A method according to claim 1 wherein
the barrier layer is located between the functional part and the component; and
the laser light is applied to a side of the functional part remote from the barrier layer.

3. A method according to claim 2 wherein
the barrier layer is provided on the functional part on a side thereof opposite the closing or adhesion elements.

4. A method according to claim 2 wherein
the barrier layer is provided on the component on a side thereof facing the functional part.

5. A method according to claim 2 wherein
the barrier layer is a part independent of the functional part and the component.

6. A method according to claim 1 wherein
in addition to a first bond between the functional part and the component formed by the laser light, a second bond is formed between the functional part and the component that is not formed by laser light to safeguard against unintentional disengagement.

7. A method according to claim 6 wherein
the second bond is formed by an adhesive compound.

8. A method according to claim 1 wherein
the one layer of the functional part is provided over another layer having an excess portion thereof extending laterally at least partially beyond the functional part, at least a part of the excess portion being formed of a laser-permeable material; and
passing the laser light through the excess portion and striking the barrier layer under the excess portion.

9. A functional part for forming a connection with a component, the functional part comprising:
a substrate element having closing or adhesion function elements in a form of hook-and-loop fasteners or Van der Waals fasteners protruding on a first side of the substrate element and formed as one first layer with the substrate element, the first layer being formed as least partially from a material at least partially transparent to laser light; and
a barrier layer on a second side of said substrate element opposite the first side thereof, the barrier layer being at least partial opaque to laser light.

10. A functional part according to claim 9 wherein
said barrier layer is an integral part of the substrate element.

11. A functional part according to claim 10 wherein
said barrier layer is incorporated inside the substrate element.

12. A functional part according to claim 10 wherein
the barrier layer is a separate layer from the layer of the substrate element and the function elements, and is mounted on the second side of the substrate element.

13. A functional part according to claim 9 wherein
a second layer is provided on the second side of the substrate element and has an excess portion thereof extending laterally at least partially beyond the substrate element and being formed at least partially of a laser permeable material.

14. A functional part according to claim 13 wherein
the second layer has an adhesive compound thereof on a side of the second layer remote from the substrate element.

15. A flame retardant total system, comprising:
a substrate element having closing or adhesion function elements in a form of hook-and-loop fasteners or Van der Waals fasteners protruding on a first side of the substrate element and formed as one first layer with the substrate element, the first layer being formed as least partially from a material at least partially transparent to laser light;
a barrier layer on a second side of said substrate element opposite the first side thereof, the barrier layer being at least partial opaque to laser light;
a second layer is provided on the second side of the substrate element and having an excess portions thereof extending laterally at opposite ends at least partially beyond the substrate element and being formed at least partially of a laser permeable material; and
an adhesive compound on a side of the second layer remote from the substrate element.

16. A flame retardant total system according to claim 15 wherein,
the adhesive compound is at locations excluded from laser light.

17. A flame retardant total system according to claim 15 wherein,
the adhesive compound is only located on the second layer between the excess portions of the second layer.

18. A flame retardant total system according to claim 15 wherein,
a third component is attached to the substrate element by the excess portions of the second layer and the adhesive compound, the component being part of an aircraft seat to be provided with a cover or upholstery material having a functional part corresponding to and matable with the function elements and being releasably connected to the function elements on said substrate element.

* * * * *